(12) United States Patent
Anderson et al.

(10) Patent No.: US 8,531,523 B2
(45) Date of Patent: Sep. 10, 2013

(54) MULTI-SENSOR LOCATION AND IDENTIFICATION

(75) Inventors: Robert J Anderson, Phoenixville, PA (US); Brian R Bolon, West Chester, PA (US)

(73) Assignee: TruePosition, Inc., Berwyn, PA (US)

( * ) Notice: Subject to any disclaimer, the term of this patent is extended or adjusted under 35 U.S.C. 154(b) by 848 days.

(21) Appl. No.: 12/633,672

(22) Filed: Dec. 8, 2009

(65) Prior Publication Data

US 2011/0134240 A1    Jun. 9, 2011

(51) Int. Cl.
*H04N 7/18*      (2006.01)
*H04N 5/225*     (2006.01)
*H04W 24/00*     (2009.01)
*G06K 9/00*      (2006.01)

(52) U.S. Cl.
USPC ........ 348/143; 348/158; 348/169; 455/456.1; 382/103

(58) Field of Classification Search
USPC ....... 348/143, 158, 169; 455/456.1; 382/103
See application file for complete search history.

(56) References Cited

U.S. PATENT DOCUMENTS

| | | | |
|---|---|---|---|
| 6,782,264 B2 | 8/2004 | Anderson | |
| 6,970,183 B1 * | 11/2005 | Monroe | 348/143 |
| 7,167,713 B2 | 1/2007 | Anderson | |
| 7,227,893 B1 * | 6/2007 | Srinivasa et al. | 375/240.08 |
| 7,466,992 B1 * | 12/2008 | Fujisaki | 455/556.1 |
| 7,634,662 B2 * | 12/2009 | Monroe | 713/186 |
| 7,783,299 B2 | 8/2010 | Anderson et al. | |
| 7,839,432 B2 * | 11/2010 | Fernandez et al. | 348/143 |
| 8,160,304 B2 * | 4/2012 | Rhoads et al. | 382/107 |
| 8,175,617 B2 * | 5/2012 | Rodriguez | 455/456.1 |
| 2003/0117316 A1 * | 6/2003 | Tischer | 342/357.1 |
| 2004/0143602 A1 | 7/2004 | Ruiz et al. | |
| 2006/0003775 A1 | 1/2006 | Anderson | |
| 2006/0030333 A1 | 2/2006 | Ward | |
| 2007/0210937 A1 | 9/2007 | Smith et al. | |
| 2008/0125964 A1 | 5/2008 | Carani et al. | |
| 2009/0268030 A1 | 10/2009 | Markham | |

OTHER PUBLICATIONS

International Patent Application No. PCT/US2010/058411: International Search Report dated Apr. 12, 2011, 4 pages.
U.S. Appl. No. 12/428,325, filed Apr. 22, 2009, Bull et al.
Waugh, "Big Brother just got scarier: Japanese CCTV camera can scan 36 million faces per second—and recognise anyone who has walked into its gaze", Mail Online, Mar. 23, 2012, http://www.dailymail.co.uk/sciencetech/articie-2119386/Coul-governme . . . , date accessed Mar. 26, 2012, 5 pages.

* cited by examiner

*Primary Examiner* — Ranodhi Serrao
(74) *Attorney, Agent, or Firm* — Woodcock Wasburn LLP

(57) ABSTRACT

By combining imaging systems with wireless location functionality, a subject's videometric signature can be linked to a public identity, thus enabling continuous surveillance outside or between the coverage area of video surveillance networks. In addition to extending the surveillance coverage area, the combination of computerized video surveillance with wireless location determination may also allow for identification of mobile device users via the existing mobile equipment and user identifiers used in the wireless network.

94 Claims, 10 Drawing Sheets

| Registration Cycle: | Cycle 1 | | | Cycle 2 | | | Cycle 3 | | |
|---|---|---|---|---|---|---|---|---|---|
| Subject: | A | B | C | D | A | B | C | D | A | B | C | D |
| Camera | | | | | | | | | | | | |
| 301 | 0 | 0 | 0 | | | | X | | | | X | |
| 302 | | | | | | | | | | | | |
| 303 | | | | | 0 | | | | X | X | | X |
| 304 | | | | | | 0 | | | | | | |
| Outside of View | | | | | | 0 | | | | | | |

Figure 3B

MULTI-SENSOR LOCATION AND IDENTIFICATION

TECHNICAL FIELD

The present invention relates generally to methods and apparatus for locating and identifying wireless devices such as those used in analog or digital cellular systems, personal communications systems (PCS), enhanced specialized mobile radios (ESMRs), and other types of wireless voice and data communications systems. More particularly, but not exclusively, the present invention relates to a method for combining information from multiple sensor types to identify and locate wireless device users.

BACKGROUND

Since the invention of the closed circuit video camera, real time surveillance of both secure and public areas has been used to augment the efficiency of human guards. The advent of the video cassette recorder (VCR) enabled the archiving of video coverage. In the mid 1970's video technology became cost effective for such public security functions as law enforcement, crowd surveillance, and highway traffic control.

The introduction of digital video cameras allowed for software analysis of the video image and during the 1990's facial recognition technology had become sufficiently accurate to be more widely deployed. After the attacks of Sep. 11, 2001, the need for recognition of individuals in secure locations by automated video systems was seen as a public necessity. In May of 2002, the United States Parks Service installed face recognition software on the computerized video surveillance cameras at the Statue of Liberty and Ellis Island.

In addition to facial recognition, video systems may also use other recognition techniques examples of which also include gait recognition, clothing recognition, and two dimensional (2-D) or three dimensional (3-D) image mapping with pattern recognition. These image recognition techniques which use still cameras, video cameras, or other imaging systems may generally be referred to as "videometric" systems. A videometric system may reduce an image or series of images into a digital signature tag. A videometric system may tag and index unidentified subjects to detect repeat visitors. However, identification and tracking of individuals is typically limited to those already identified stored in the video network database. Furthermore, videometric systems are limited by the fields of view provided by the installed imaging systems. A videometric signature is a identification of features allowing for identification of a subject. Much like fingerprints, a videometric signature is unique to an individual, but more subject to change over a long duration.

Technology for locating wireless devices (e.g., cell phones) with high accuracy began to be widely deployed in response to the United States Federal Communications Commission (FCC) Enhanced 9-1-1 Phase II mandate. Wireless location technologies include both network-based and handset based technologies. The network-based high accuracy technologies use the uplink (mobile-to-base station) radio signaling from the handset with Time-of-Arrival (TOA), Time-Difference-of-Arrival (TDOA), and/or Angle of Arrival (AoA) techniques to locate a mobile device. High accuracy location technologies may include the use of a timing beacon systems such as a Global Navigation Satellite System (GNSS), the prime example being the NAVSTAR Global Positioning System (GPS). Use of GNSS signals and signaling from the wireless communications network allow for Assisted GNSS (A-GNSS) which lowers the time needed to generate a position fix over conventional GPS and can increase receiver sensitivity.

Medium accuracy location technologies are sometimes used for localization of transmitters either as a fallback method or in conjunction with a high accuracy localization technique. These techniques include the network-based techniques of cell-ID localization and may include the addition of timing or power ranging Signal-Strength-Measurement (SSM) with calibrated RF fingerprinting (a pattern matching technique). The handset-based medium accuracy technologies include downlink radio signal techniques such as Enhanced Observed Time Difference (E-OTD), Advanced Forward Link Trilateration (AFLT), and Observed Time Difference of Arrival (OTDOA).

Hybridization of location technologies may also be used. Various combinations of U-TDOA, AoA, AFLT, A-GPS, TOA, SSM, and OTDOA have been successfully fielded while other combinations of the high or high/medium accuracy handset and network location techniques have been proposed.

Passive Location using network-based wireless location techniques relies on the monitoring of the radio air interface or WCN links and waiting for the mobile device to execute a network transaction either on the control channel or traffic channel. These network transactions include periodic re-registration, as well as ad hoc events such as call or data connection related events (initiation, termination, handover) and roaming events such as location updating.

Active Location using network-based wireless location techniques relies on cooperation or co-opting of the wireless location system. Cooperative arrangements include polling or auditing via system messaging examples of which include Identity Request, Any_Time_Interrogation (ATI) (as part of the Mobile Terminated Location Request Procedure), Null SMS pinging or simply calling or messaging the mobile in question. Co-opting of the WCN includes use of a control-channel only IMSI catcher base station where idle mobiles devices are momentarily re-registered, a honey-pot base station where both on-call (in session) mobile devices are captured, interrogated and identified, or placing small WCN cells in specific areas with localized paging areas (location areas) to force mobiles to re-register.

For further background information relating to the subject matter described herein, the reader may refer to the following patent applications assigned to TruePosition Inc.: U.S. patent application Ser. No. 11/150,414, "Advanced Triggers for Location-Based Service Applications in a Wireless Location System," filed Jun. 10, 2005; Ser. No. 11/198,996, "Geo fencing in a Wireless Location System," filed Aug. 8, 2005; and Ser. No. 12/428,325, "Network Autonomous Wireless Location System," filed Apr. 22, 2009. Each of these are hereby incorporated by reference in its entirety.

SUMMARY

In many operational scenarios, the determined location of a wireless device may not be available. For example, the device may be temporarily shielded from receiving from or transmitting to the wireless network. Furthermore, imaging or videometric systems can only provide identification and tracking functionality when they have a sufficiently unobstructed field of view of the subject. Described herein are various methods and systems for providing a fallback technique. In some embodiments, such systems may be combined to provide seamless or uninterrupted location, tracking, and surveillance services. By combining computerized video surveillance with wireless location functionality, a subject's videometric signature can be more readily linked to a publicly known personal identity, thus enabling continuous surveillance outside or between the coverage areas of video surveillance networks. This seamless surveillance can be real-time or archived for future forensic analysis Linking of videometric signatures to public identities may further allow for automated provisioning of videometric databases. In addition to extending the surveillance coverage area, the combination of computerized video surveillance with wireless location determination may also allow for identification of mobile device users via the existing mobile equipment and user identifiers used in the wireless network.

In one embodiment, a method of tracking a subject associated with a mobile device is disclosed. The method may include receiving image data from an image capture device, receiving identification information and location information for the mobile device, analyzing the received image data, and determining that the received image data is associated with said mobile device based on the analyzed image data and location information associated with said mobile device, and otherwise associating the received image data with the mobile device identified by said location and said identification information.

It should be noted that this summary is provided to introduce a selection of concepts in a simplified form that are further described below. This summary is not intended to identify key features or essential features of the claimed subject matter, nor is it intended to be used as an aid in determining the scope of the claimed subject matter.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure.

BRIEF DESCRIPTION OF THE DRAWINGS

The foregoing summary as well as the following detailed description is better understood when read in conjunction with the appended drawings. For the purpose of illustrating the invention, there is shown in the drawings exemplary constructions of the invention; however, the invention is not limited to the specific methods and instrumentalities disclosed in the drawings:

FIGS. 3A and 3B illustrate a location facilitated identification of a subject under video surveillance.

DETAILED DESCRIPTION

Figure 1:
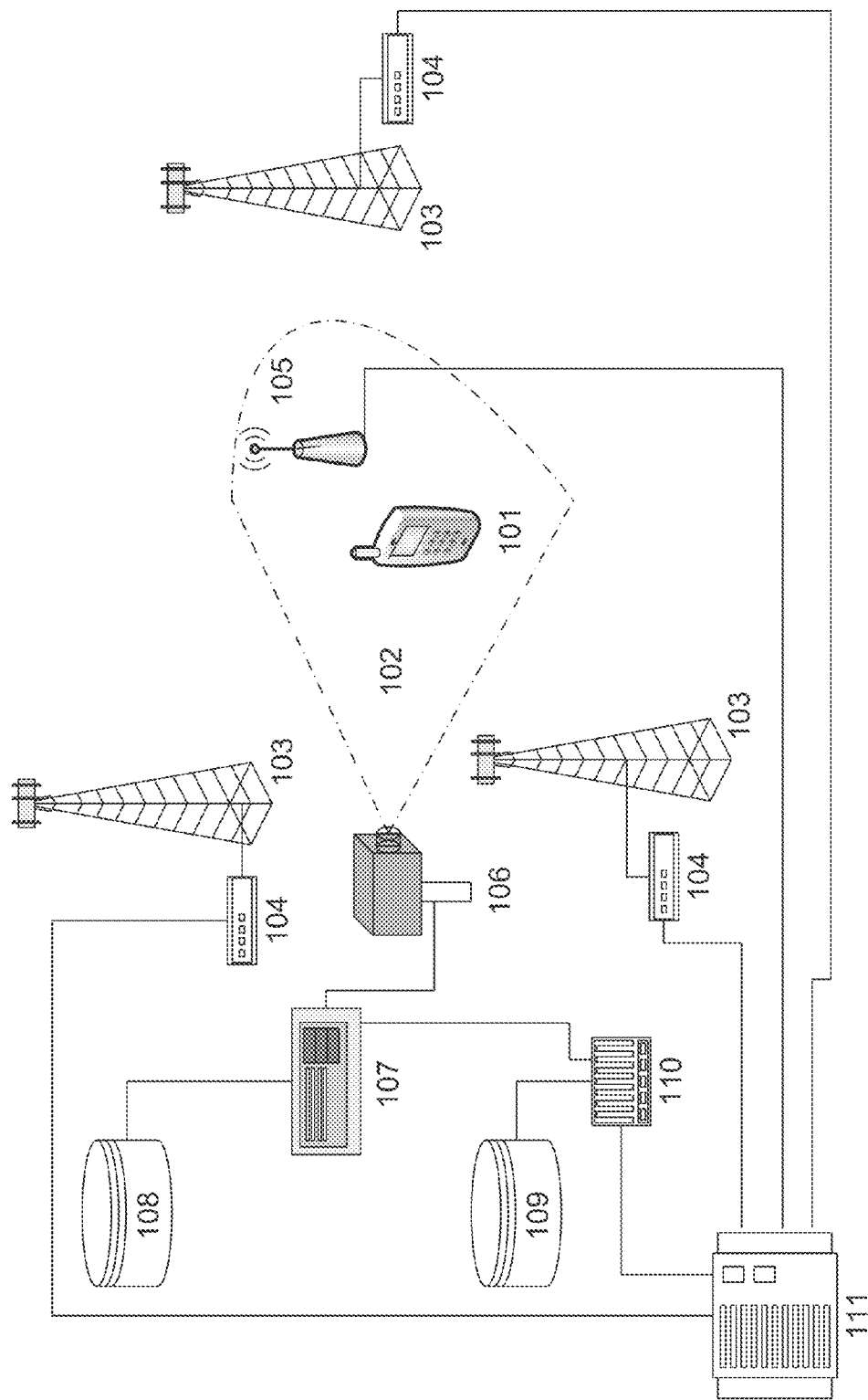
FIG. 1 schematically depicts the major functional components Wireless Communications Network with wireless location capability and a geographically co-located computerized video/photographic surveillance network.

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Described are illustrative embodiments of the present disclosure. First, a detailed overview of the problem is provided, followed by a more detailed description of the disclosed subject matter.

Biometrics refers to methods for uniquely identifying a subject based upon one or more intrinsic physical characteristics. Biometrics may be used as a method of secured access management and access control, and can also be used to identify subjects who are under surveillance. Examples of biometric characteristics can include the shape of the body, fingerprints, face recognition, DNA, hand and palm geometry, and iris recognition.

In a biometric system, the first time a subject uses the biometric system may be referred to as enrollment. During enrollment, biometric information from a subject may be stored. During subsequent identifications, biometric information may be detected and compared with the information stored at the time of enrollment. Such a biometric system may include a sensor for receiving information from the subject and providing the input to the system. The system may also perform pre-processing to enhance or otherwise prepare the input (e.g. removing background noise). The system may then extract features needed for identification. The features may be represented in any form such as a vector or an image with particular properties. The set of features that uniquely identifies a subject may be referred to as a signature.

During enrollment the features may be stored in a storage. During a matching or identification phase, the obtained features may be passed to a matching function that compares the features to other existing sets of features. A set of features may be called a template. In some embodiments, the distance between templates may be estimated using an appropriate algorithm.

A facial recognition system may automatically identify a subject from a digital image or a video frame from a video source. In some embodiments, selected facial features from the image and a facial database may be compared. Some facial recognition algorithms may identify faces by extracting features from an image of the subject's face. For example, a facial recognition algorithm may analyze the relative position, size, and/or shape of the eyes, nose, cheekbones, and jaw. The extracted features may then be used to search for other images with matching features. In other embodiments, a facial recognition algorithm may normalize a collection of facial images and compress the data, saving the data in the image that is useful for facial detection. Some examples of recognition algorithms include Linear Discriminate Analysis, the Hidden Markov model, and the neuronal motivated dynamic link matching. 3-D A system for capturing and recognizing images may comprise one or more capture devices such as a digital or analog camera with suitable optics for acquiring images, a camera interface for digitizing images, input/output hardware or communication link, and a program for processing images and detecting features of the image.

Photo or video recognition may thus be used for the identification of individuals or subjects via a databased "snapshot" of physical parameters (generally known as a photometric or videometric database entry). However, it is the population of this videometric database that may limit the use of such recognition functionality. For instance, in a video surveillance system overlooking a secure facility such as a railroad yard, a videometric database populated with every employee and potential authorized visitor may be needed to reliably detect a trespasser. The recorded videometric detail of the trespasser can potentially be used to detect intrusion by the same individual a second time, but identification of the trespasser may not be ascertained from the videometric data alone despite the creation of the videometric tag. In some cases, the public identity may not be available from the wireless device (for example in the case of prepaid mobiles), in such cases, the videometric signature may have a public ID associated with it which can then in turn be applied to the previously unidentified wireless device ID. In other cases, the mobile device public ID may not match the known videometric based public ID (in the case of a stolen mobile).

Network-based Wireless Location Systems (WLS) may be used to locate wireless devices from the radio emissions (the uplink radio channel broadcasts) transmitted by the wireless device during control, voice or data sessions between the Wireless Communications Network (WCN) and the wireless device. Accuracy of a network-based WLS may be limited by the short duration, low-power and limited bandwidth of the communications signals, and thus the localization of a particular wireless device in the field-of-view of a video surveillance system from a set of wireless devices may be difficult. Disclosed herein are methods for matching a wireless device and a videometric signature. Once a localized wireless device and a videometric signature have been correlated, retrieval of the wireless identity and thus the public identity of the subject associated with the wireless device can be performed.

The techniques and concepts described herein may apply to time and frequency division multiplexed (TDMA/FDMA) radio communications systems including the widely used GSM and OFDM-based (e.g. IEEE-802.16 "WiMAN", IEEE-802.20 "WIMAX", and 3GPP Long Term Evolution (LTE)) wireless systems, as well as code-division radio communications systems such as CDMA (IS-95, IS-2000) and Universal Mobile Telecommunications System (UTMS), the latter of which is also known as W-CDMA. In addition, short range communications systems such as active or passive Radio Frequency ID (RFID) tags, Bluetooth wireless technology and Ultra-Wideband (UWB) data communications can also be used for proximity location and identification purposes.

The Global System for Mobile Communications (GSM) radio access network and core network is used as an exemplary wireless radio communications system but is not the exclusive environment in which the present disclosure may be implemented.

Identification

The combination of the disparate sensor networks of video and wireless location may provide a non-intrusive method of populating a joint database of videometric signatures via co-location of the subject and the wireless device. A wireless device identity, such as in the case of a subscribed semi-permanent user account, is typically attached to the public identity of an individual. Hence, correlation of the wireless device identity and its wireless location with the estimated or known location of an imaged and parameterized subject may allow for the identification of the subject without the requirement for a pre-existing videometric database entry.

For wide area wireless communications systems, wireless devices include identification of the device and user (e.g., the telephone number, the Electronic Serial Number (ESN), the MIN (Mobile Identification Number), the International Mobile Equipment Identifier (IMEI), the International Mobile Station Identifier (IMSI), the Mobile Station Identifier (MSI), the Temporary Mobile Station Identifier (MSI)), the Mobile Equipment Identifier (MEID), Mobile Station Integrated Services Digital Network number (MS-ISDN)). These identifiers, which vary according to the wireless communications technology (also known as the radio access network technology) used, are necessary to allow the mobile phone to function. These standardized identifiers are available either over the radio signaling interface between the mobile and the Wireless Communications Network (WCN), from within a WCN, or used in signaling between disparate WCNs.

Changes in the wireless identifiers or changes between associated wireless identifiers can be used to trigger the wireless location and identification system. An example of associated identifiers includes the IMEI which identifies a mobile device, and the IMSI which identifies a subscriber module (SIM). Insertion of a new SIM, replacement of the SIM, or replacement of the wireless device all change the association between IMEI and IMSI and thus can be detected by the WLIS and used a location triggering event.

Short-range communications systems such as WiFi (IEEE 802.11), RFID, Bluetooth and Ultra-Wideband may be used for identification and location (via proximity) when the subject carries or is otherwise in close proximity to an equipped device. Such persistent and readable identifiers may allow for a location determination and provide a persistent identifier in place of or in addition to the videometric and/or wireless identifiers.

RFID tags are typically designed to be read by readers in close proximity. Each RFID tag may have a unique identifier and may contain other information (such as passport information or product information). The subject may carry an RFID tag associated with the wireless communications device. Alternatively, the subject may carry or wear an article that includes an RFID tag.

Bluetooth devices may use an inquiry procedure to discover nearby devices or to be discovered by other devices in their locality. The Bluetooth identifier is both persistent and unique to each Bluetooth device.

WiFi Network interface devices typically provide their Media Access Control (MAC) address, also more formally known as the EUI (Extended Unique Identifier). The MAC/EUI is both persistent and unique to each Wireless Network Interface Controller (NIC or WNIC).

Ultra-Wideband (UWB) devices may broadcast their persistent identifiers in response to an interrogation signal. A UWB reader that provides the interrogation signal may receive the identifier and establish a proximity location. In some cases RFID tags may use Ultra-Wideband radios. The various described systems and protocols may have varying degrees of overlap in spectrum and technology.

In the case of non-subscribed wireless mobile phones and devices, electronic identifiers transmitted by the mobile device for registering with the network and placing/receiving calls can nevertheless be correlated to a videometric signature, allowing for persistent surveillance of the subject.

Extended Surveillance

Once a subject has been localized and identified within a video surveillance network, continued surveillance may be enabled outside or between the coverage area of video surveillance networks using mobile device location technologies. These technologies include network-based location systems, mobile-based location techniques, and standardized control functions such as the Mobile Terminated Location Request (MTLR) or the setting of Wireless Intelligent Network (WIN) triggers in the WCN infrastructure.

This seamless surveillance can be performed in real-time or can be archived for future forensic analysis. In addition to extending the surveillance coverage area, the combination of computerized video surveillance with wireless location determination may also allow for identification of mobile phone users via the existing mobile equipment and user identifiers used in the wireless network.

Entry and Exit Geofencing

The Automatic Geo-fencing concept detailed in U.S. patent application Ser. No. 11/198,996 "Geo-Fencing In A Wireless Location System" can be expanded in a coordinated video surveillance and wireless location network.

In an exemplary geo-fencing method, a geo-fenced area may be defined. A set of predefined signaling links of the wireless communications system may be monitored. The method may further include detecting that a mobile device has performed any of the following acts with respect to the geo-fenced area: (1) enter the geo-fenced area, (2) exit the geo-fenced area, and (3) move within a predefined proximity range near the geo-fenced area. A high-accuracy location function may then be triggered in order to determine the geographic location of the mobile device.

Once a subject has been tagged by the videometric/photographic system and identified, the mobile identifiers and videometric signature can be substituted, allowing for automatic, trip-wire geo-fence boundaries to be erected not only on wireless boundaries (such as cell, sector or paging area boundaries), but also on field-of-view boundaries. Both entry and exiting of a subject can be determined by the combined videometric and WLS controlling system.

Wide Area Localization and Histograms

Wide area localization, also known as the collection of mobile identification in an area, was first described in U.S. patent application Ser. No. 11/150,414, "Advanced Triggers for Location-Based Service Applications in a Wireless Location System," filed Jun. 10, 2005. Disclosed was an exemplary method including monitoring a set of signaling links of a wireless communications system, and detecting at least one predefined signaling transaction occurring on at least one of the predefined signaling links. In response to the detection of the at least one predefined network transaction, at least one predefined location service is triggered. The combination of video surveillance networks and wireless location improves on the wide-area concept by allowing creation of statistical data collections such as histograms. The statistical data collections may be based on the subject's location, movements, calling patterns, and co-location with other subjects.

Mobile phones and devices may be identified and located on the basis of presence in a defined geographic area under radio coverage by a sector, a cell or group of cells at a particular time or span of time. This historical location feature may be accomplished by loading an area, defined as a set of cells identifiers, into the passive overlay or integrated Link Monitoring System (LMS). The LMS may then develop a list mobile identifiers (e.g., in GSM the IMSIs, MSISDNs, and associated TMSIs) that initiated a network transaction in the geographic area of interest.

Wide Area Localization may also be configured to generate a running list of mobile identifiers that initiate a future network transaction in the pre-set geographic area of interest.

By adding the photometric or videometric snapshot data database, the wide area localization technique may be improved by allowing for the identification of a subject in a geographic area of interest when the associated mobile(s) are not transmitting. Alternately, the combination of the snapshot and wireless location capabilities may allow for Wide Area Localization outside of the coverage area of a video surveillance network.

Camera and Imaging Alternatives

While many existing video surveillance networks are designed to provide images in the visible spectrum, video and still camera surveillance using ultraviolet or infrared light, millimeter or terahertz radar imaging, or other passive (using existing illumination) or active (using directed illumination or transmitters) techniques can be used to provide the photometric or videometric snapshot data used to uniquely identify subjects under surveillance. In the present disclosure, the terms image capture system and camera may refer to all kinds of imaging systems using active or passive technologies, such as video cameras, still cameras, and radio tomographic imaging (RTI) system.

Identity Correlation Using Other Databases

In some embodiments, the use of a stored database of video to mobile device correlations may be augmented with alternative databases. For example, existing video surveillance networks may use photographs such as mug-shots, passport photos, driver licenses, or identification cards to build a videometric database. Similarly, the disclosed wireless location/identifications system and videometric database combination can be primed with supplementary videometric signatures and mobile identifiers of interest. Furthermore, when performing real time or time delayed forensic analysis of database records, videometric signatures obtained through multiple means can be added to the identification process.

Examples may include camera-equipped automatic teller machines (ATMs) in which both videometric signatures and bank account information can be associated. Another example is data from camera-equipped points of sale (POS) in which credit card information and other public identity data (such as a governmental identity card) may be used.

Any scenario during which identification from a subject must be presented (e.g., an event ticket counter) presents an opportunity for the collection of a public identity, a videometric signature, and a wireless ID if the subject is carrying an active or idle wireless device.

Those skilled in the art will recognize that the disclosed subject matter may be carried out with any type of subject that can carry or otherwise be associated with a mobile device. For example, in an embodiment the subject can be a vehicle. In this embodiment, not only can videometric signatures of a vehicle be used to identify the make, model, and color of the vehicle, but automatic license plate recognition can be used to identify the registry or current renter of the vehicle. Mobile identities of the occupants of the vehicle, obtained using one of the above methods, can be linked to the vehicle ID. Since vehicles are often operated by a single individual such as the owner, the accuracy of the videometric filter may be high. In one embodiment, the correlation of the vehicle ID to the mobile ID can be used to identify a stolen vehicle.

Some video-based automatic number plate recognition systems have the capability to take a photo or video of the occupants of the vehicle. A videometric signature may then be obtained and the data used to link the vehicle to the occupant(s).

Some vehicles may be equipped or installed with embedded wireless communications and wireless location systems. Such installed systems can also be used to identify and locate the vehicle.

Multi-Interval, Multi-Camera Filtering

In some embodiments, multiple cameras may be used. In a multi-camera scenario in which a videometric signature is used to identify a subject, the multiple cameras may be used in one instance or over multiple image captures from one or more cameras to identify a subject. In one embodiment, all mobile devices in the immediate vicinity of the subject may be located and identified. For example, the videometric data may identity the same person at multiple cameras at different times. Location data for all mobile devices in the vicinity of the cameras may be received. Wireless device IDs that correlate strongly to multiple instances of the videometric signature may be considered as a match.

Thus in one embodiment, if the subject of interest is correlated to multiple phones and multiple videometric profiles are collected at multiple locations or multiple times, an association between the mobile phones, videometric profiles and the subject of interest may be assumed.

Velocity Filtering

Another filtering technique for correlating a videometric ID with a wireless identity is use of velocity (heading and speed). The velocity of a subject can be determined through the use of wireless location technologies that use frequency difference of arrival in the determination of a location, detect the Doppler shift in uplink radio signals, or track a series of locations for a subject. A photographic or video system may determine the direction of a tagged subject as the subject moves across the camera's field of view. An approach or movement away from the camera can be detected and measured by a change in perspective size of the captured images. In other embodiments, multiple cameras with overlapping fields of view may be used to determine velocity using, for example, the classical parallax solution for velocity determination. Matching of the videometric determined velocity with the wireless location system determined velocity can be accomplished via a correlation algorithm. Elimination of potential matches may also be accomplished using this method.

Choke Points

In some embodiments, close-in wireless location techniques with vehicular or pedestrian choke points can be used to associate a videometric identity with a mobile identity. Examples of vehicular chokes points can include traffic signals, highway on-ramps, off-ramps, bridges, or toll booths. Examples of pedestrian choke points can include airport entrances, stadium entrances, building entrances, escalators, stairwells, and elevators.

In one embodiment, a wireless device may be used to identify the subject carrying the device under certain scenarios such as at public choke points where high volumes of people pass through a small area throughout the day. Examples can be subway entrances, stadium entrances, any security entrance to a public building or airport, sidewalks, mall entrances, and toll booths. One or more wireless stimulation and detection techniques can be used to determine if a wireless device is passing through the choke point. By communicating with the mobile device, an identity of the device may be determined. The device's identity can be the IMSI/IMEI for a mobile phone, MAC/EUI address for a WiFi device, or RFID information for any RFID device that may be carried or in the vicinity of the subject. For example, an RFID tag may be embedded in a carried product or on an identification badge carried on the person.

The location may be determined as a function of the time and position of sensors and transmitters located, for example, in a security entrance or at a specific point on a sidewalk. Sensors and transmitters may, for example, be included in metal detector or RFID detector sensors, or may be embedded into the natural surroundings as to not be conspicuous (such as in a sidewalk, along a street pole, or along side a building).

Location determination may isolate an individual out of a crowd and determine what wireless devices are on such person and the ID of such devices. A well positioned camera can capture an image of the person, and the image may then be associated with the device(s). The received and analyzed information, including the photo, device info and ID, date, time, location may all be stored in a database for further processing.

The captured image may be processed by a facial recognition product to further determine the subject's identity. In many cases, availability of the device ID and an associated image (with time stamp) may provide valuable information for security and intelligence agencies. The device ID information can then be referenced back to the stored information and the image of the subject may be used for:

ID of the person using the device

Correlation of multiple detections of the same device, e.g., determining if the device is being passed between different people or always the same person Multiple detections and photos from other sources can be used to increase the probability of a correct face-to-ID match Facial recognition programs, body and clothing identifiers, and gait recognition techniques can be used to match a subject to a videometric signature. The device ID may then be associated with the videometric signature. In the case of a subject that frequently changes wireless devices, provided that the subject passes through the monitored choke point, information regarding the associated wireless identifiers will be constantly updated and the latest device identifier in use can be determined. Furthermore, a historical timeline of the devices used by the subject can be maintained.

Once the videometric signature is associated to a wireless device, public safety agencies can review the collected historical information to determined where the devices has been located and thus infer that the associated subject was present at the recorded locations.

In one embodiment, a close proximity network of RF sensors and transmitters may be deployed with a computerized video network to cover a throughway. The throughway may be situated such that enhanced videometric signatures may be acquired, such as in a traffic signal or crosswalk. A series of highly directional antennas can be used to create a two dimensional array in space as a cross section of a throughway (e.g., a pedestrian walkway or vehicular motorway). The array may allow relative positioning on the throughway (left, center, right) or the specific point on the sidewalk (e.g., a desired distance from the corner or the street). Such a system may be used to provide improved resolution for correlating videometric signatures to the associated wireless identifiers for cases in which multiple subjects (e.g., pedestrians or vehicles) pass abreast or side by side through the vicinity of interest.

Through predetermined selection and construction of the choke point monitoring system, location and identification of multiple subjects at chokepoints may be enabled. Well-known active wireless identifier systems such as the IMSI catcher, the honey-pot BTS, or specially positioning paging/location area boundaries may be used with choke point deployments.

FIG. 1

FIG. 1 illustrates an example videometric system situated within a wireless communications network (WCN) with wireless location capability. The WCN in this illustration is depicted by the wireless base stations 103 and core network server 111 (the Base Station Controller (BSC) and Mobile Switching Center (MSC) using GSM terminology).

The wireless device 101, depicted in the figure as a mobile phone, may be carried by a subject. The subject may be a person, an animal, or a vehicle. The wireless device 101 may be within the field-of-view 102 of at least one camera (e.g., still photograph or video) 106 that provides image data for determining a videometric signature at the linked videometric server 107. The videometric signature may be stored in a videometric database 108. Before or after storage, the developed videometric signature may be analyzed by the videometric server 107 for matches to other prior entries in the videometric database 108.

If no match between videometric signatures are found, then the videometric server 107 may query the wireless location and identification system (WLIS) server 110 to determine if there is a match between the subject's position and that of a wireless device 101 within the geographic vicinity within the camera 106 field-of-view 102. The Wireless Location and Identification system server 110 may be queried for all mobile identifications in the geographic area matching the camera 106 field-of-view 102

Location and identification of the wireless device 101 may be triggered by passive means (see U.S. Pat. Nos. 6,782,264 and 7,167,713 both entitled "Monitoring Of Call Information In A Wireless Location System" and U.S. patent application Ser. No. 11/150,414; "Advanced Triggers For Location-Based Service Applications In A Wireless Location System") or active means (see U.S. patent application Ser. No. 12/428,325; "Network Autonomous Wireless Location System"). The ability to locate the wireless device and identify the device may be a function of a network-based overlay wireless location system, an integrated (with the WCN 111 104) network-based wireless location system, or as part of the WCN infrastructure 111 itself as a software application within the Wireless Intelligent Network (WIN) subsystem that communicates with the WLIS 110. User plane location and identification of the wireless device 101 may be possible although the potential number of wireless devices to be identified, interrogated, and located may cause capacity issues within the WCN. The on-board ability of the wireless device 101 to self-locate (a mobile-based or mobile-assisted location) can limit the accuracy of any user-plane location technique. Once a location and identification is developed for a wireless device, this information may be stored in a database 109 and can be delivered to the videometric server 107 at any time.

As part of this example network, a short range communication access point 105 is shown within the field-of-view 102. If such an RF terminal exists within the field-of-view, additional persistent identifiers may be acquired by interaction with RFID, WiFi, Bluetooth, Ultra-Wideband, or other beacon tagging transceivers by offering connectivity to the tagging transceivers via broadcast. Location of such short range radio transceivers is typically determined by proximity to the terminal although directional antennas can be used to define and/or extend the coverage area.

FIG. 2

Figure 2:
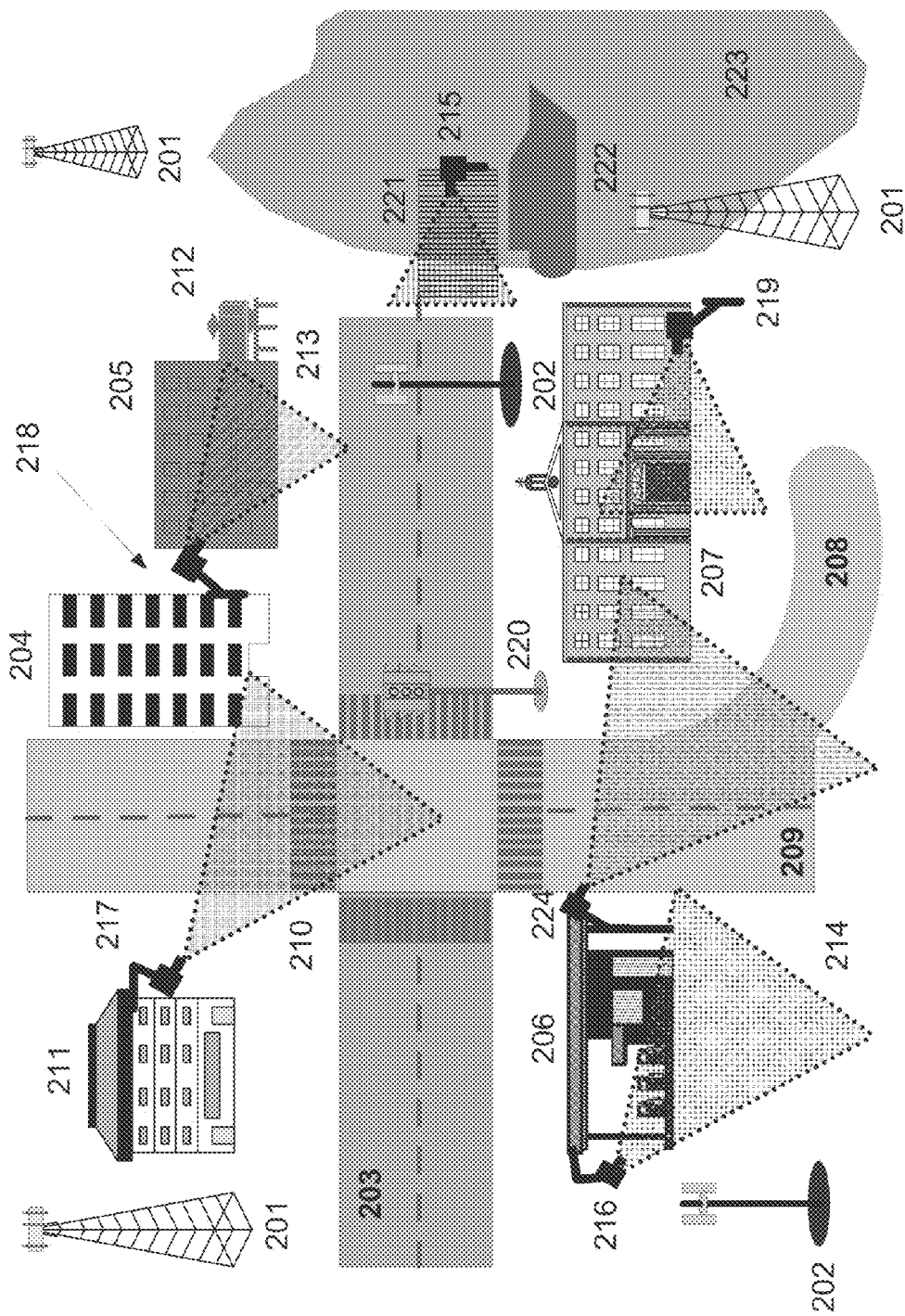
FIG. 2 illustrates opportunities for a location facilitated identification of a subject under video surveillance in an urban area.

Referring to FIG. 2, illustrated are example embodiments showing cellular coverage and camera coverage. As discussed, the ability of the camera system to provide spot coverage over choke points for pedestrian traffic and vehicular traffic may allow for the association of the videometric signature data to data acquired from the wireless communications and location systems. Illustrated in the figure is one embodiment of how networked cameras may provide distinct geographical areas of coverage for geo-fencing. In the cityscape shown in FIG. 2, a wireless network with wide area macro-cells 201 and shorter range micro-cells 202 is shown (smaller cells such as Pico and Femto cells, as well as repeaters and distributed antennae systems (DAS) are not shown due to complexity). This wireless network may be equipped with network-based wireless location and identification capabilities.

In an embodiment, a networked camera 217 mounted on a nearby building 211 covers crosswalk 210. The crosswalk 210 both controls the flow of pedestrians and directs pedestrians directly through the camera 217 field of view. The traffic signals 220 which control the intersection of local roads 203 209 also provide a metered flow of pedestrians and vehicles as not to strain the capacity of the videometric system.

In another embodiment, a networked camera 218 may be mounted on a neighboring building 204 to cover the entrance 213 to a public transportation station 205. The entrance 213 is another example of a pedestrian concentrator that provides an opportunity for videometric signature development. Additionally, identification and location of subjects entering station 205 may allow for scheduling of resources for continued wide area location of a subject after boarding train or bus 212.

In another embodiment, a networked camera 215 may be positioned to cover a dockyard 221. Passengers boarding a ferry 222 are within the camera 215 field of view and can be identified. Once on the water 223, continued wide area location can be accomplished via the wireless location system while the boat(s) is still in range of the wireless communications network 201 202.

In another embodiment, a networked camera 219 may cover an entrance to a governmental building 207. Videometric signatures with wireless identifiers can be used to maintain a log of visitors to the governmental building 207.

In another embodiment, a camera 224 may be mounted to cover an access ramp 208 onto the local roadway 209. The access ramp 208 provides a metered flow of vehicles for development of videometric signatures of both the vehicles and the individuals visible within the vehicles. The access ramp 208 may also provide an opportunity to collect the wireless identification of subjects entering the city.

In another embodiment, a camera 216 may cover the point-of-sale terminals co-located within the service station 206. The point-of-sale terminals may allow vehicle users to pay-at-the-pump using credit and debit cards. Videometric signatures may be developed while a vehicle is being filled. Identifiers may be collected from wireless devices and vehicle identity plates. In real time or at a later time using post-analysis, the identifiers and signatures may be matched with financial identifiers acquired during the credit or debit transactions.

FIGS. 3A & 3B

Figure 3A:
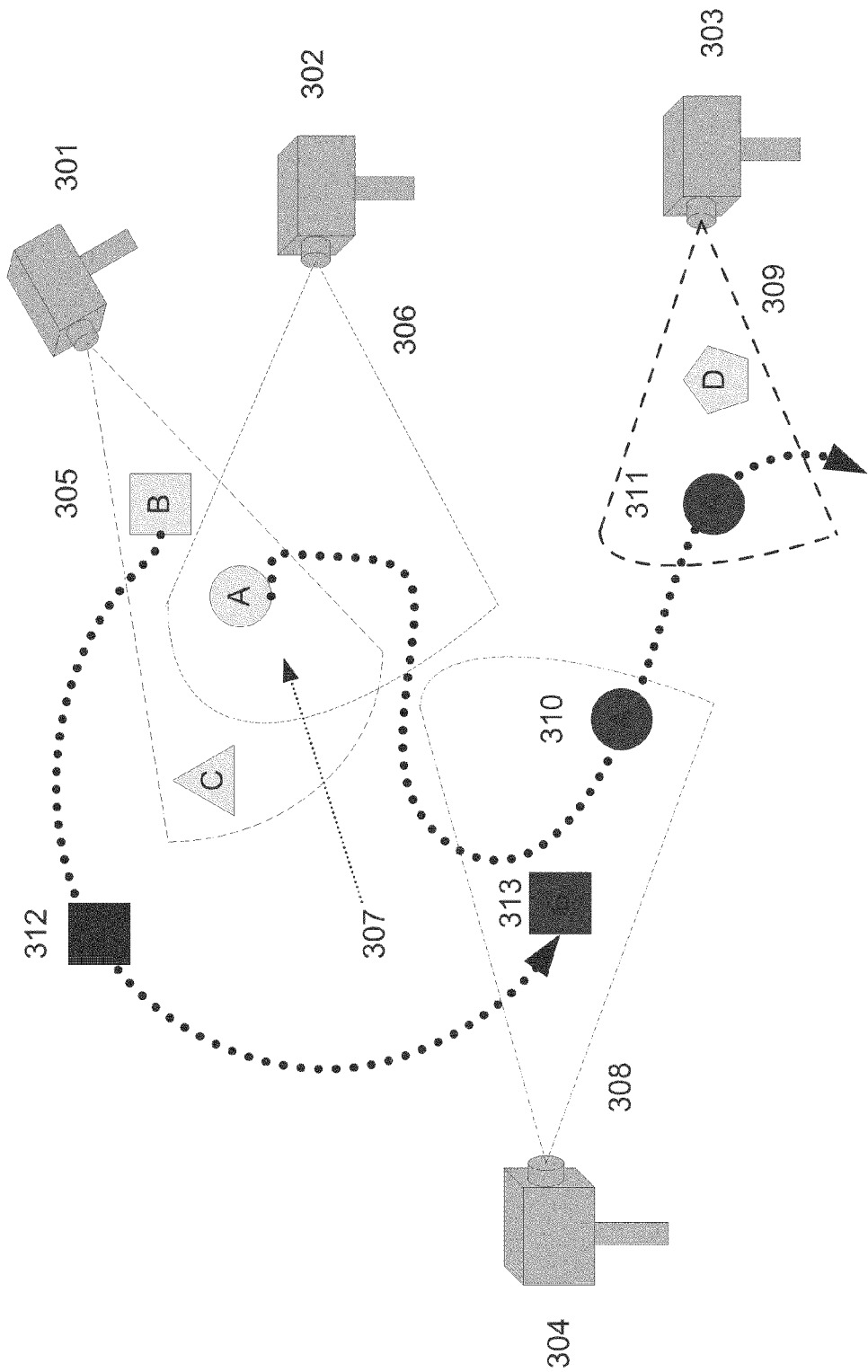

FIG. 3A illustrates an example of the filtering and associative ability of the sensor fusion system. In one embodiment, the local Wireless Communications System (WCN) may be configured to require served wireless devices to periodically re-register with the WCN. The resulting stream of registrations provides the WLIS system opportunity to collect locations on the wireless devices.

Referring to FIG. 3A, a first camera 301 may tag subjects A, B, and C. Three wireless locations and identities may be developed by the Wireless Location and Identification System (WILS) for the geographic area containing A, B, and C, but in this example, due to the inaccuracy of the WILS, the tightly clustered subjects A, B, and C cannot be matched to distinguish videometric and mobile device identities during the first registration cycle. Furthermore, due to overlapping coverage areas 307 between cameras 301 and 302, subject A appears in both the fields of view of the first camera 301 and second camera 302.

During the first registration cycle, subjects A, B, and C are located in proximity to camera 301 and 302. In a second registration cycle, subject C is located still in proximity to camera 301, but subject A is now at a new location 310 that lies within the field of view 308 of camera 304 and subject B is located at a new location 312 outside of the field of view of any networked camera.

In a subsequent registration cycle, subject A is located at another new location 311. Subject D is also located, tagged and identified within the field-of-view 309 of camera 303. Subject B is located in proximity to camera 304 and is identified using its videometric signature as within the camera field of view 308. Subject C remains located in the field of view of camera 301.

By the end of the above described registration cycles, sufficient location and identity information has been obtained to positively correlate videometric signatures with wireless identifiers for subjects A, B, C and D.

FIG. 3B depicts the identification processes in tabular form. The three registration cycles are shown in the three columns Cycle 1, Cycle 2, and Cycle 3. Each of the registration cycle columns are subdivided into four columns, one for each of the four subjects tagged in this example. The four cameras and their coverage areas are depicted as the rows. In the rows, an "O" is used to indicate a tagged but not positively indentified subject. An "X" is used to indicate that a subject has been tagged and positively identified.

FIG. 4

Figure 4:
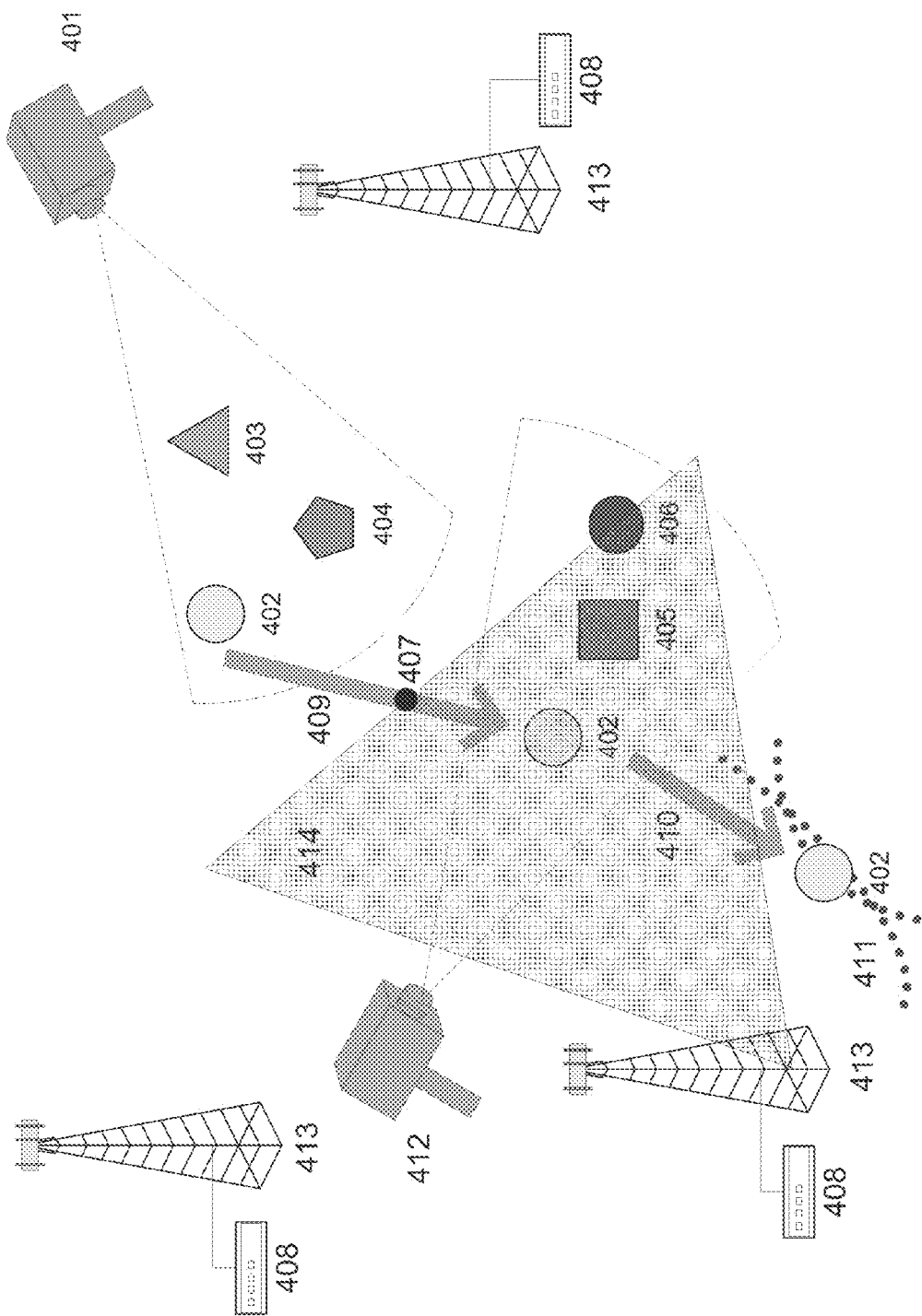
FIG. 4 illustrates a location facilitated identification of a subject under video surveillance.

FIG. 4 illustrates an example method of combining video coverage and wireless event filtering in one embodiment of a multiple sensor network. In this illustrative example, three subjects 402 403 404 are assigned videometric signatures (i.e., tagged) while in the field of view of a first camera 401. A first subject 402 leaves the field of view of first camera 401 and proceeds (as indicated by arrow 409) across a cell boundary 407 and into the field of view of a second camera 412. The videometric signature of subject 402 as developed from the image(s) taken by the second camera 412 match that of the subject 402 developed by the first camera 401. The wireless communications network 413 with associated network-based Wireless Location and Identification System (WLIS) 408 provides the means to locate and identify a wireless device.

The cell boundary crossing 407 allows the Wireless Location and Identification System (WLIS) 408 to catch any network events (e.g., handover) if the subject was engaged in an active communications session. If the wireless device was idle and a paging area boundary was crossed, a re-registration would occur, presenting the WLIS with an opportunity to locate and identify the wireless device.

In this example, only one subject 402 is detected as moving between cameras 401 and 412. The tagged subjects 403 and 404 in the first camera 401 field of view and the tagged subjects 405 and 406 in the second camera 412 field of view have not provided a network transaction that can be used to augment the location and identification functions in this example.

Because one subject 402 has been positively identified, when subject 402 moves to a subsequent position outside of the videometric coverage area 411, continued tracking can be accomplished using standardized location techniques.

FIG. 5

Figure 5:
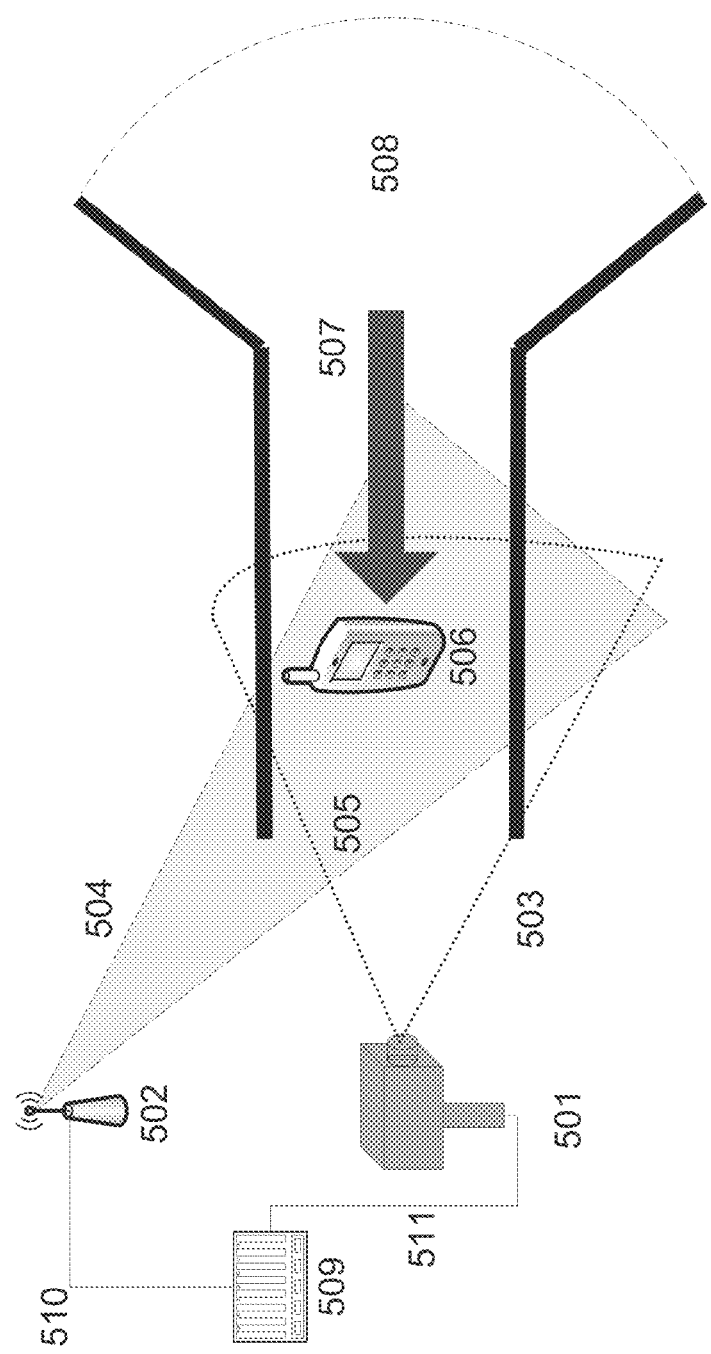
FIG. 5 illustrates a location facilitated surveillance of a subject entering video surveillance coverage through a chokepoint.

Illustrated in FIG. 5 is one embodiment of a choke point technique filtering method. In this example, the wireless location and identification system is depicted as a Wireless Transceiver 502 with a radio footprint 504 that covers the bottleneck of the choke point 508. A camera system 501 with a field-of-view 503 also covers the bottleneck of the choke point 508. The camera system 501 may be communicatively coupled to the Wireless Transceiver 502. The resulting shared coverage area 505 allows for a proximity based location to be determined and a mobile device identification may be obtained while simultaneously receiving a picture or video captured by the camera system 501. Since both the camera field of view 503 and the Wireless Transceiver radio footprint 504 are tightly bounded as is the flow of subjects through the choke point 508, the matching of the mobile identification, mobile location and videometric signature may be constrained. In this example, the wireless device moves 507 thought the choke point 508, allowing the camera system 501 to capture a facial or frontal image. Additional cameras may be deployed to capture side and back views of the subject.

In this example the Wireless Transceiver 502 is an active location and identification system. In other embodiments, passive location systems in which the WLS receiver is paired with a WCN Femto-cell base station may also be used. In the active location system, as first taught in U.S. patent application Ser. No. 12/428,325; "Network Autonomous Wireless Location System," the onboard location system of the wireless device 506 may be used to generate the required location.

FIG. 6

Figure 6:
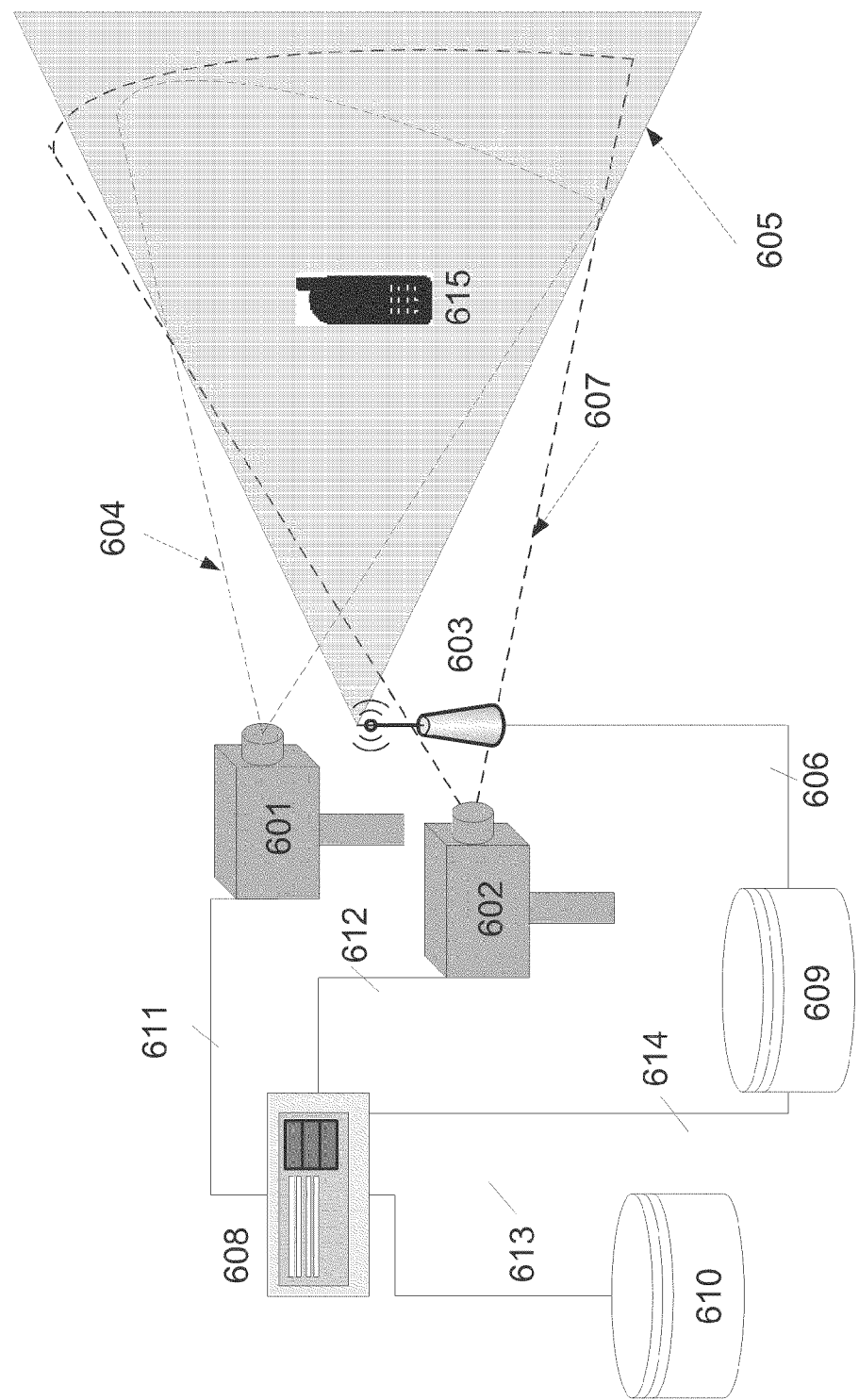
FIG. 6 illustrates a location facilitated identification of a subject in a video surveillance coverage area which uses parallax (stereopsis) to estimate the range and motion of a subject.

Illustrated in FIG. 6 is one embodiment of a location-facilitated location/identification of a subject in a video surveillance coverage area using parallax (stereopsis) techniques to estimate the range and motion of a subject. A parallax system is an optical angle of arrival system that can be used by the networked video system to estimate the location and movement of a subject.

As illustrated in the figure, in one embodiment at least one pair of cameras 601 602 is co-located with a directional identification node 603 (e.g., an active IMSI catcher or passive Radio Network Monitor). The cameras 601 602 are networked via wired or wireless packet data links 611 612 to a video network controller/server 608. The video network controller 608 may develop a videometric signature of the subject carrying the wireless device 615 as well as calculate the range and motion of the subject.

In this example, the active identification node 603 is equipped with a directional antenna designed provide a coverage area 605 covering the camera field-of-views 604 607 limiting the interrogation area. Once a subject has been tagged and the subject's location and motion has been calculated by the video network controller 608, the time stamped mobile device identity autonomously collected by the identification node 603 and transmitted to storage over link 606 may be acquired from the identification database 609 over packet data link 614. The video network controller/server 608 may correlate the videometric ID, the identity information, and the subject's range and motion into a single record. The record may be transmitted for further analysis or stored in a database 610.

Embodiments

Figure 7:
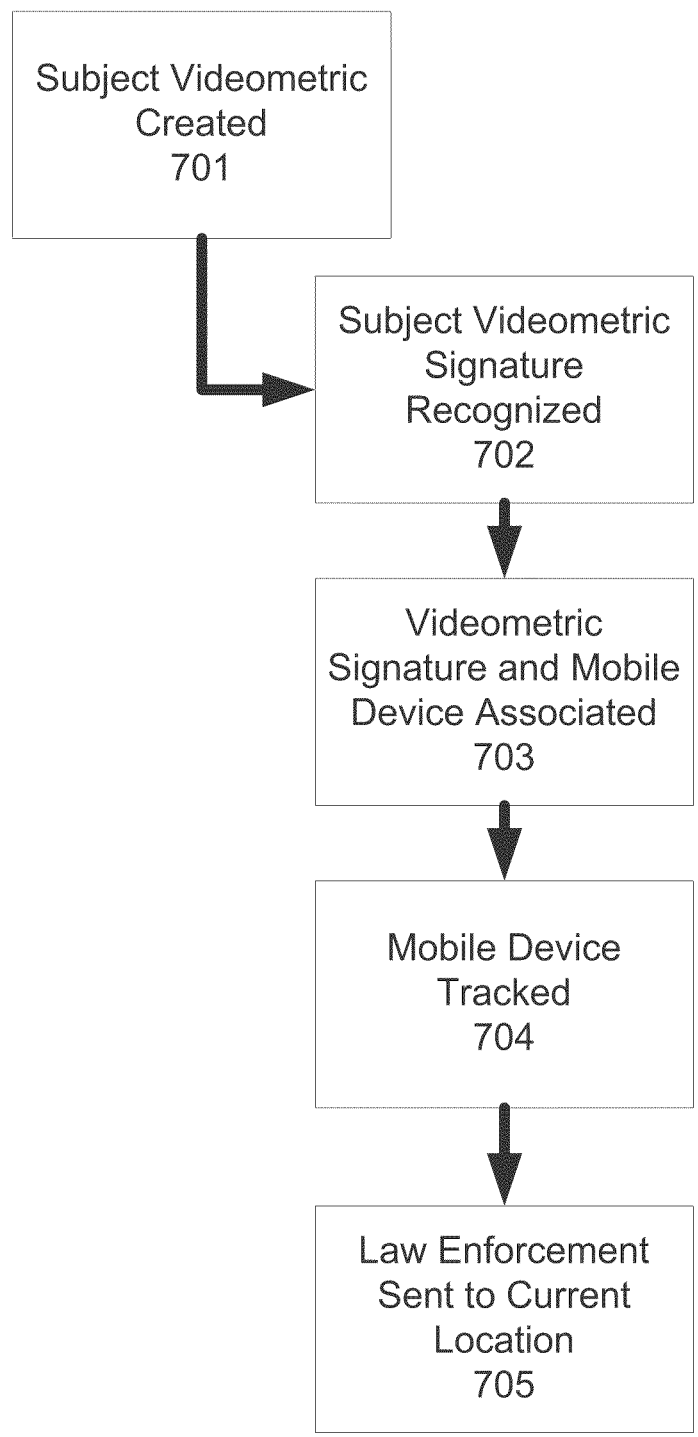
FIG. 7 illustrates an example of an operational procedure incorporating aspects of the present disclosure.

Referring now to FIG. 7, illustrated is an exemplary process incorporating various aspects of the disclosed methods. One or more of the illustrated operations may be omitted, and the illustrated operations do not imply a particular order. In one exemplary method, a subject may be identified by videometric signature 702. The signature may be developed by an outside database or recognized by the videometric controller (or videometric system operator) subsequent to tagging 701.

Using the location, identification, and filtering techniques disclosed, a mobile device may be associated with the subject 703. Network-based or mobile based mobile location technologies may then be used to track the subject 704. Law enforcement personnel may then be directed to the subject for apprehension using the updated location 705.

Figure 8:
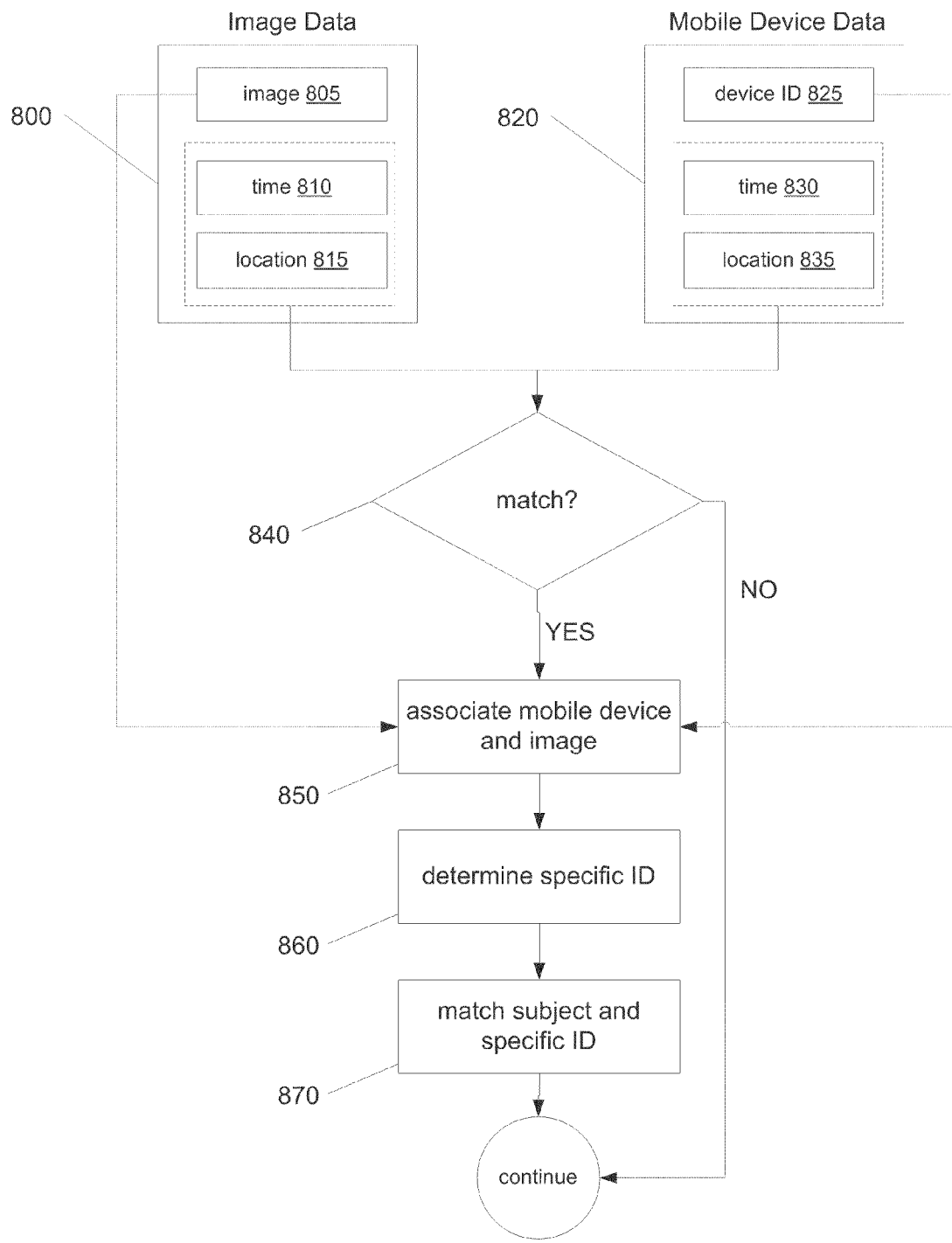
FIG. 8 illustrates an example of an operational procedure for tracking a subject associated with a mobile device.

Referring now to FIG. 8, illustrated is an exemplary process for tracking a subject associated with a mobile device. One or more of the illustrated operations may be omitted, and the illustrated operations do not imply a particular order. In one exemplary method, FIG. 8 illustrates an image data set 800 and mobile device data set 820. The image data set 800 may further comprise image information 805, time information 810, and location information 815. Mobile device data set 820 may further comprise mobile device identification 825, time information 830, and location information 835. Process 840 illustrates processing the image data set 800 and a mobile device location data set 820 to determine a match. In one embodiment, a match may be indicated when the time and location information from the image and mobile device data sets meet a prescribed degree of correlation. Those skilled in the art will recognize that a degree of correlation may be prescribed in a number of ways that are well known. For example, the degree of correlation may be determined as a function of the degree of proximity of the location of the imaging source and the mobile device location provided by a location determination system, and/or the degree of similarity between the time stamps of the image data and the mobile device data. The degree of correlation may be selectable and predetermined based on a number of factors. Such factors may include, for example, the uncertainty or error of the time stamping function of the imaging source and the mobile device information source, or the expected uncertainty or error of the location data provided by the location determination source. If multiple imaging and/or mobile device information sources are used, then a more sophisticated process may be used to determine the degree of correlation. When post-processing is used, the stored image and mobile device information may be analyzed and statistical methods may be used to determine the degree of correlation. Any number of methods may be used to determine the degree of correlation and the association between the image information and mobile device information.

In process 850, in response to determining a match between the image data set 800 and mobile device data set 820, a specific mobile device may be associated with a specific image. The method may further comprise analyzing a specific image represented by the image data set 800 to determine 860 a specific personal identity to associate with the specific image and the specific mobile device. The method may further comprise determining 870 that the subject to be tracked corresponds to the specific personal identify. In some embodiments, the location of the specific mobile device may be tracked as a proxy for tracking the subject.

Figure 9:
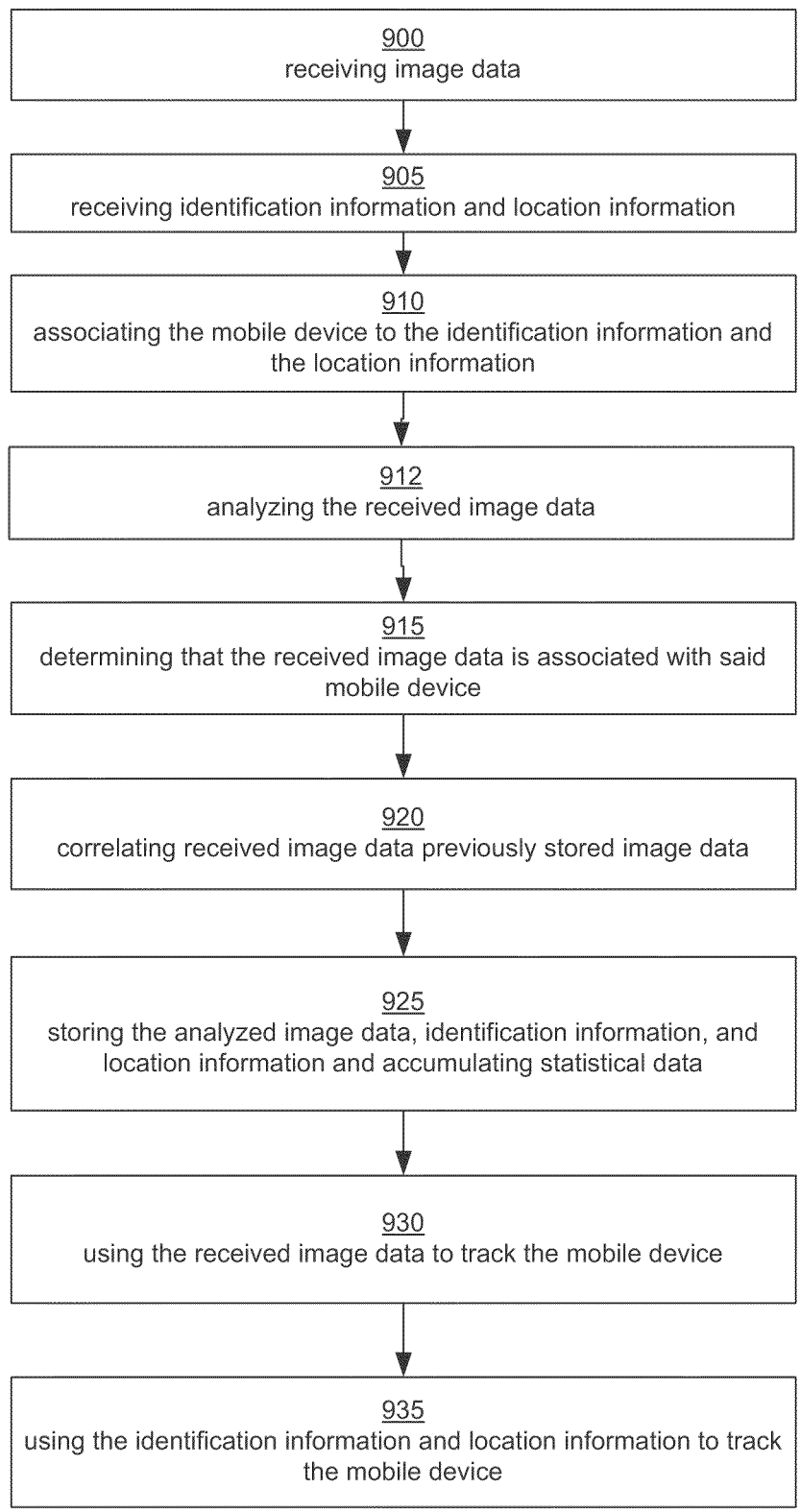
FIG. 9 illustrates another example of an operational procedure for tracking a subject associated with a mobile device.

Referring now to FIG. 9, illustrated is another exemplary process for tracking a subject associated with a mobile device. One or more of the illustrated operations may be omitted, and the illustrated operations do not imply a particular order. In one exemplary method, process 900 illustrates receiving image data from at least one image capture device, wherein the image data comprises at least a portion of an image representing a subject. In process 905, identification information and location information for the mobile device is received. In an embodiment, the identification information comprises a mobile device ID and a public ID associated with the mobile device. The method further comprises associating the mobile device to the identification information and the location information 910.

In one embodiment, the method further comprises analyzing the received image data 912 and determining that the received image data is associated with said mobile device based on the analyzed image data and previously stored image data 915. Additionally and optionally, the received image data may be correlated to previously stored image data according to a predetermined correlation level 920.

In one embodiment, the image data comprises video surveillance data. The location information may be received from a network-based wireless location system configured to locate wireless devices using radio emissions from the wireless devices. In various embodiments, the wireless communications network may be a local wireless communications network and comprise one of a WiFi (IEEE 802.11), RFID, Bluetooth or Ultra-Wideband network. These local wireless communications technologies are illustrative and other technologies may be used. In other embodiments, the wireless communications network may be a wide area wireless communications network and comprise one of GSM, WiMAN, WIMAX, CDMA, and W-CDMA. These wide area wireless communications technologies are illustrative and other technologies may be used. In one embodiment, the subject may be a vehicle.

In an embodiment, the at least one image capture device may comprise a first and second image capture device, and the subject may be tracked as the subject moves from the first image capture device's field of view to the second image capture device's field of view. Furthermore, image data from the first and second image capture devices may be used to track the subject In one embodiment, the analyzed image data, identification information, and location information may be stored and statistical data based on the stored image data, identification information, and location information may be accumulated 925. Additionally and optionally, the received image data may be used to track the mobile device when the mobile device is not located by the wireless location system 930. Alternatively, the identification information and location information may be used to track the mobile device when the subject is out of a field of view of the image capture device 935.

In an embodiment, a direction of movement of the mobile device based on the received image data may be determined. In one embodiment of the method, said at least one image capture device may comprise a first and second image capture device with overlapping fields of view and a velocity of the mobile device based on the received image data from the first and second image capture devices may be determined.

CONCLUSION

Any of the above mentioned aspects can be implemented in methods, systems, computer readable media, or any type of manufacture. It should be understood to those skilled in the art that the various techniques described herein may be implemented in connection with hardware or software or, where appropriate, with a combination of both. For example, aspects of the invention may execute on a programmed computer. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations. In example embodiments a computer readable storage media can include for example, random access memory (RAM), a storage device, e.g., electromechanical hard drive, solid state hard drive, etc., firmware, e.g., FLASH RAM or ROM, and removable storage devices such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, Bernoulli cartridges, and the like. The computer readable storage media may provide non-volatile storage of processor executable instructions, data structures, program modules and other data for a computer.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, various mechanisms were disclosed for tracking a subject associated with a mobile device. However, other equivalent mechanisms to these described aspects are also contemplated by the teachings herein. Therefore, the present disclosure should not be limited to any single aspect, but rather construed in breadth and scope in accordance with the appended claims.

What is claimed is:

1. A computer-implemented method of tracking a subject associated with a mobile device, comprising:
   using a computer, processing an image data set and a mobile device location data set to determine a match, wherein the image data set comprises image, time and location information, and the mobile device location data set comprises mobile device identification, time and location information, and wherein a match is indicated when the time and location information from the image and mobile device data sets meet a prescribed degree of correlation; and
   in response to determining a match between the image and mobile device data sets, associating a specific mobile device with a specific image;
   wherein at least one of the subject's personal identity and location is unknown;
   wherein the image data set is received from an image capture system comprising a plurality of image capture devices; and
   wherein the mobile device location data set is received from a wireless location system configured to locate mobile devices; and
   further comprising analyzing the specific image to determine a specific personal identity to associate with the specific image and the specific mobile device, determining that the subject to be tracked corresponds to the specific personal identity, and tracking the location of the specific mobile device as a proxy for tracking the subject.

2. The method of claim 1, wherein the image data set comprises video surveillance data.

3. The method of claim 1, wherein the mobile device comprises a wireless communications transceiver for communicating with a wireless communications network.

4. The method of claim 3, wherein the wireless communications network is a local wireless communications network.

5. The method of claim 3, wherein the wireless communications network is a wide area wireless communications network.

6. The method of claim 1, further comprising monitoring entry and exit of the subject with respect to a geo-fence boundary, wherein the geo-fence boundary is at least partially defined by a field-of-view of an image capture device.

7. The method of claim 1, further comprising storing the analyzed specific image, image data set and mobile device location data set and accumulating statistical data based on the analyzed specific image, image data set and mobile device location data set.

8. The method of claim 1, further comprising using the image data set to track the subject.

9. The method of claim 1, further comprising using the mobile device location data set to track the subject.

10. The method of claim 1, wherein the subject is a vehicle.

11. The method of claim 1, wherein said image data set is received from a first and second image capture device, further comprising tracking the subject as the subject moves from the first image capture device's field of view to the second image capture device's field of view, and using image data from the first and second image capture devices to track the subject.

12. The method of claim 1, further comprising determining a direction of movement of the mobile device based on the image data set.

13. The method of claim 1, wherein said image data set is received from a first and second image capture device with overlapping fields of view.

14. The method of claim 13, further comprising determining a velocity of the mobile device based on the image data set received from the first and second image capture devices.

15. The method of claim 1, wherein the method is performed at a choke point.

16. A computer-implemented method of tracking a subject associated with a mobile device, wherein at least one of the subject's personal identity and location is unknown, the mobile device having a wireless communications transceiver for communicating with a wireless communications network, the method comprising:

receiving image data from at least one image capture device, wherein the image data comprises at least a portion of an image representing said subject;

receiving identification information and location information for the mobile device, wherein the identification information comprises a mobile device ID and a public ID associated with the mobile device, and wherein the identification information and location information for the mobile device are received from a network-based wireless location system configured to locate mobile devices using radio emissions from the mobile devices;

analyzing the received image data; and determining that the received image data is associated with said mobile device based on the analyzed image data and previously stored image data, wherein said determining comprises determining that the received image data is correlated to the previously stored image data according to a predetermined correlation level; and further comprising monitoring entry and exit of the subject with respect to a geo-fence boundary, wherein said at least one image capture device comprises a first and second image capture device, and further comprising tracking the subject as the subject moves from the first image capture device's field of view to the second image capture device's field of view, and using image data from the first and second image capture devices to track the subject.

17. The method of claim 16, wherein the image data comprises video surveillance data.

18. The method of claim 16, wherein the wireless communications network is a local wireless communications network.

19. The method of claim 16, wherein the wireless communications network is a wide area wireless communications network.

20. The method of claim 16, further comprising storing the analyzed image data, identification information, and location information and accumulating statistical data based on the stored image data, identification information, and location information.

21. The method of claim 16, further comprising using the received image data to track the mobile device when the mobile device is not located by the wireless location system.

22. The method of claim 16, further comprising using the identification information and location information to track the mobile device when the subject is out of a field of view of the image capture device.

23. The method of claim 16, wherein the subject is a vehicle.

24. The method of claim 16, further comprising determining a direction of movement of the mobile device based on the received image data.

25. The method of claim 16, wherein said at least one image capture device comprises a first and second image capture device with overlapping fields of view.

26. The method of claim 25, further comprising determining a velocity of the mobile device based on the received image data from the first and second image capture devices.

27. The method of claim 16, wherein the method is performed at a choke point.

28. A computer-implemented method of tracking a subject's location, wherein the subject is associated with a mobile device having a wireless communications transceiver for communicating with a wireless communications network, the method comprising:

receiving image data from an image capture device associated with a geographic location, wherein the image data comprises an image capturing at least a portion of said subject;

analyzing the received image data and determining that the received image data is associated with the subject;

determining that location information from a location determination service is not available for the mobile device; and using the geographic location of the image capture device as a location for the subject until said location information becomes available; and further comprising monitoring entry and exit of the subject with respect to a geo-fence boundary, wherein said at least one image capture device comprises a first and second image capture device, and further comprising tracking the subject as the subject moves from the first image capture device's field of view to the second image capture device's field of view, and using image data from the first and second image capture devices to track the subject.

29. The method of claim 28, wherein the location information is received from a network-based wireless location system configured to locate wireless devices using radio emissions from the wireless devices.

30. A method of correlating a subject's location with a mobile device, the mobile device having a wireless communications transceiver for communicating with a wireless communications network, the method comprising:

receiving image data from at least one image capture device, wherein the image data comprises an image capturing at least a portion of said subject;

analyzing the received image data and determining a signature for said subject based on the analyzed image data;

requesting identification information and location information for the mobile device; and associating the signature with said identification information and location information, wherein the location information is received from a network-based wireless location system configured to locate wireless devices using radio emissions from the wireless devices; and further comprising monitoring entry and exit of the subject with respect to a geo-fence boundary, analyzing a specific image to determine a specific personal identity to associate with the specific image and a specific mobile device, determining that the subject to be tracked corresponds to the specific personal identity, and tracking the location of the specific mobile device as a proxy for tracking the subject.

31. A system configured to track a subject associated with a mobile device, wherein at least one of the subject's personal identity and location is unknown, the system comprising at least one processor and at least one storage medium communicatively coupled to said at least one processor, the storage medium having stored therein computer-executable instructions for instructing the processor in causing the following steps:

processing an image data set and a mobile device location data set to determine a match, wherein the image data set comprises image, time and location information, and the mobile device location data set comprises mobile device identification, time and location information, and wherein a match is indicated when the time and location information from the image and mobile device data sets meet a prescribed degree of correlation;

in response to determining a match between the image and mobile device data sets, associating a specific mobile device with a specific image;

wherein the image data set is received from an image capture system comprising a plurality of image capture devices; and wherein the mobile device location data set is received from a network-based wireless location system configured to locate wireless devices using radio emissions from the wireless devices; and further comprising analyzing the specific image to determine a specific personal identity to associate with the specific image and the specific mobile device, determining that the subject to be tracked corresponds to the specific personal identity, and tracking the location of the specific mobile device as a proxy for tracking the subject.

32. The system of claim 31, wherein the image data set comprises video surveillance data.

33. The system of claim 31, wherein the mobile device comprises a wireless communications transceiver for communicating with a wireless communications network.

34. The system of claim 33, wherein the wireless communications network is a local wireless communications network.

35. The system of claim 33, wherein the wireless communications network is a wide are wireless communications network.

36. The system of claim 31, further comprising monitoring entry and exit of the subject with respect to a geo-fence boundary, wherein the geo-fence boundary is at least partially defined by a field-of-view of an image capture device.

37. The system of claim 31, further comprising storing the analyzed specific image, image data set and mobile device location data set and accumulating statistical data based on the analyzed specific image, image data set and mobile device location data set.

38. The system of claim 31, further comprising using the image data set to track the subject when the mobile device is not located by the wireless location system.

39. The system of claim 31, further comprising using the mobile device location data set to track the subject when the image data set is not available.

40. The system of claim 31, wherein the subject is a vehicle.

41. The system of claim 31, wherein said image data set is received from a first and second image capture device, further comprising tracking the subject as the subject moves from the first image capture device's field of view to the second image capture device's field of view, and using image data from the first and second image capture devices to track the subject.

42. The system of claim 31, further comprising determining a direction of movement of the mobile device based on the image data set.

43. The system of claim 31, wherein said image data set is received from a first and second image capture device with overlapping fields of view.

44. The system of claim 43, further comprising determining a velocity of the mobile device based on the image data set received from the first and second image capture devices.

45. The system of claim 31, wherein the method is performed at a choke point.

46. A system configured to track a subject associated with a mobile device, wherein at least one of the subject's personal identity and location is unknown, the mobile device having a wireless communications transceiver for communicating with a wireless communications network, the system comprising at least one processor and at least one storage medium communicatively coupled to said at least one processor, the storage medium having stored therein computer-executable instructions for instructing the processor in causing the following steps:

receiving image data from at least one image capture device, wherein the image data comprises at least a portion of an image representing said subject;

receiving identification information and location information for the mobile device, wherein the identification information comprises a mobile device ID and a public ID associated with the mobile device;

analyzing the received image data; and determining that the received image data is associated with said mobile device based on the analyzed image data and previously stored image data, wherein said determining comprises determining that the received image data is correlated to the previously stored image data according to a predetermined correlation level; and further comprising monitoring entry and exit of the subject with respect to a geo-fence boundary, wherein said at least one image capture device comprises a first and second image capture device, and further comprising tracking the subject as the subject moves from the first image capture device's field of view to the second image capture device's field of view, and using image data from the first and second image capture devices to track the subject.

47. The system of claim 46, wherein the image data comprises video surveillance data.

48. The system of claim 46, wherein the location information is received from a network-based wireless location system configured to locate wireless devices using radio emissions from the wireless devices.

49. The system of claim 48, further comprising using the received image data to track the mobile device when the mobile device is not located by the wireless location system.

50. The system of claim 48, further comprising using the identification information and location information to track the mobile device when the subject is out of a field of view of the at least one image capture device.

51. The system of claim 46, wherein the wireless communications network is a local wireless communications network.

52. The system of claim 46, wherein the wireless communications network is a wide area wireless communications network.

53. The system of claim 46, further comprising monitoring entry and exit of the subject with respect to a geo-fence boundary based on the location information and the identification information.

54. The system of claim 49, further comprising storing the analyzed image data, identification information, and location information and accumulating statistical data based on the stored image data, identification information, and location information.

55. The system of claim 46, wherein the subject is a vehicle.

56. The system of claim 46, further comprising determining a direction of movement of the mobile device based on the received image data.

57. The system of claim 46, wherein said at least one image capture device comprises a first and second image capture device with overlapping fields of view.

58. The system of claim 57, further comprising determining a velocity of the mobile device based on the received image data from the first and second image capture devices.

59. The system of claim 46, wherein the method is performed at a choke point.

60. A system configured to track a subject's location, wherein the subject is associated with a mobile device having a wireless communications transceiver for communicating with a wireless communications network, the system comprising at least one processor and at least one storage medium communicatively coupled to said at least one processor, the storage medium having stored therein computer-executable instructions for instructing the processor in causing the following steps:
receiving image data from an image capture device, wherein the image data comprises an image capturing at least a portion of said subject;
analyzing the received image data and determining that the received image data is associated with the subject;
determining that location information from a location determination service is not available for the mobile device;
using a geographic location of the image capture device as a location for the subject until said location information becomes available; and
monitoring entry and exit of the subject with respect to a geo-fence boundary, wherein said at least one image capture device comprises a first and second image capture device, and tracking the subject as the subject moves from the first image capture device's field of view to the second image capture device's field of view, and using image data from the first and second image capture devices to track the subject.

61. The system of claim 60, wherein the location information is received from a network-based wireless location system configured to locate wireless devices using radio emissions from the wireless devices.

62. A system configured to correlate a subject's location with a mobile device, the mobile device having a wireless communications transceiver for communicating with a wireless communications network, the system comprising at least one processor and at least one storage medium communicatively coupled to said at least one processor, the storage medium having stored therein computer-executable instructions for instructing the processor in causing the following steps:
receiving image data from at least one image capture device, wherein the image data comprises an image capturing at least a portion of said subject;
analyzing the received image data and determining a signature for said subject based on the analyzed image data;
requesting identification information and location information for the mobile device; and
associating the signature with said identification information and location information, wherein the location information is received from a network-based wireless location system configured to locate wireless devices using radio emissions from the wireless devices; and
monitoring entry and exit of the subject with respect to a geo-fence boundary, analyzing a specific image to determine a specific personal identity to associate with the specific image and a specific mobile device, determining that the subject to be tracked corresponds to the specific personal identity, and tracking the location of the specific mobile device as a proxy for tracking the subject.

63. A non-transitory computer readable storage medium storing thereon computer executable instructions for tracking a subject associated with a mobile device, said computer executable instructions for:
processing an image data set and a mobile device location data set to determine a match, wherein the image data set comprises image, time and location information, and the mobile device location data set comprises mobile device identification, time and location information, and wherein a match is indicated when the time and location information from the image and mobile device data sets meet a prescribed degree of correlation;
in response to determining the match between the image and mobile device data sets, associating a specific mobile device with a specific image;
wherein at least one of the subject's personal identity and location is unknown;
wherein the image data set is received from an image capture system comprising a plurality of image capture devices; and
wherein the mobile device location data set is received from a network-based wireless location system configured to locate wireless devices using radio emissions from the wireless devices; and
analyzing the specific image to determine a specific personal identity to associate with the specific image and the specific mobile device, determining that the subject to be tracked corresponds to the specific personal identity, and tracking the location of the specific mobile device as a proxy for tracking the subject.

64. The computer readable storage medium of claim 63, wherein the image data set comprises video surveillance data.

65. The computer readable storage medium of claim 63, wherein the mobile device comprises a wireless communications transceiver for communicating with a wireless communications network.

66. The computer readable storage medium of claim 65, wherein the wireless communications network is a local wireless communications network.

67. The computer readable storage medium of claim 65, wherein the wireless communications network is a wide area wireless communications network.

68. The computer readable storage medium of claim 63, further comprising instructions for monitoring entry and exit of the subject with respect to a geo-fence boundary, wherein the geo-fence boundary is at least partially defined by a field-of-view of an image capture device.

69. The computer readable storage medium of claim 63, further comprising instructions for storing the analyzed specific image, image data set and mobile device location data set and accumulating statistical data based on the analyzed specific image, image data set and mobile device location data set.

70. The computer readable storage medium of claim 63, further comprising instructions for using the image data set to track the mobile device when the mobile device is not located by the wireless location system.

71. The computer readable storage medium of claim 63, further comprising instructions for using the mobile device location data set to track the mobile device when the image data set is not available.

72. The computer readable storage medium of claim 63, wherein the subject is a vehicle.

73. The computer readable storage medium of claim 63, wherein said image data set is received from a first and second image capture device, further comprising tracking the subject as the subject moves from the first image capture device's field of view to the second image capture device's field of view, and using image data from the first and second image capture devices to track the subject.

74. The computer readable storage medium of claim 63, further comprising instructions for determining a direction of movement of the mobile device based on the image data set.

75. The computer readable storage medium of claim 63, wherein said image data set is received from a first and second image capture device with overlapping fields of view.

76. The computer readable storage medium of claim 75, further comprising instructions for determining a velocity of the mobile device based on the received image data set from the first and second image capture devices.

77. The computer readable storage medium of claim 63, wherein the method is performed at a choke point.

78. A non-transitory computer readable storage medium storing thereon computer executable instructions for tracking a subject associated with a mobile device, wherein at least one of the subject's personal identity and location is unknown, the mobile device having a wireless communications transceiver for communicating with a wireless communications network, said computer executable instructions for:
receiving image data from at least one image capture device, wherein the image data comprises at least a portion of an image representing said subject;
receiving identification information and location information for the mobile device, wherein the identification information comprises a mobile device ID and a public ID associated with the mobile device;
analyzing the received image data; and
determining that the received image data is associated with said mobile device based on the analyzed image data and previously stored image data, wherein said determining comprises determining that the received image data is correlated to the previously stored image data according to a predetermined correlation level; and
monitoring entry and exit of the subject with respect to a geo-fence boundary, wherein said at least one image capture device comprises a first and second image capture device, and tracking the subject as the subject moves from the first image capture device's field of view to the second image capture device's field of view, and using image data from the first and second image capture devices to track the subject.

79. The computer readable storage medium of claim 78, wherein the image data comprises video surveillance data.

80. The computer readable storage medium of claim 78, wherein the location information is received from a network-based wireless location system configured to locate wireless devices using radio emissions from the wireless devices.

81. The computer readable storage medium of claim 80, further comprising instructions for using the received image data to track the mobile device when the mobile device is not located by the wireless location system.

82. The computer readable storage medium of claim 80, further comprising instructions for using the identification information and location information to track the mobile device when the subject is out of a field of view of the at least one image capture device.

83. The computer readable storage medium of claim 78, wherein the wireless communications network is a local wireless communications network.

84. The computer readable storage medium of claim 78, wherein the wireless communications network is a wide area wireless communications network.

85. The computer readable storage medium of claim 78, further comprising instructions for monitoring entry and exit of the subject with respect to a geo-fence boundary based on the location information and the identification information.

86. The computer readable storage medium of claim 78, further comprising instructions for storing the analyzed image data, identification information, and location information and accumulating statistical data based on the stored imaged data, identification information, and location information.

87. The computer readable storage medium of claim 78, wherein the subject is a vehicle.

88. The computer readable storage medium of claim 78, further comprising instructions for determining a direction of movement of the mobile device based on the received image data.

89. The computer readable storage medium of claim 78, wherein said at least one image capture device comprises a first and second image capture device with overlapping fields of view.

90. The computer readable storage medium of claim 89, further comprising instructions for determining a velocity of the mobile device based on the received image data from the first and second image capture devices.

91. The computer readable storage medium of claim 90, wherein the method is performed at a choke point.

92. A non-transitory computer readable storage medium storing thereon computer executable instructions for tracking a subject's location, wherein the subject is associated with a mobile device having a wireless communications transceiver for communicating with a wireless communications network, said computer executable instructions for:
receiving image data from an image capture device, wherein the image data comprises an image capturing at least a portion of said subject;
analyzing the received image data and determining that the received image data is associated with the subject;
determining that location information from a location determination service is not available for the mobile device;
using a geographic location of the image capture device as a location for the subject until said location information becomes available; and
monitoring entry and exit of the subject with respect to a geo-fence boundary, wherein said at least one image capture device comprises a first and second image capture device, and tracking the subject as the subject moves from the first image capture device's field of view to the second image capture device's field of view, and using image data from the first and second image capture devices to track the subject.

93. The computer readable storage medium of claim 92, wherein the location information is received from a network-based wireless location system configured to locate wireless devices using radio emissions from the wireless devices.

94. A non-transitory computer readable storage medium storing thereon computer executable instructions for correlating a subject's location with a mobile device, the mobile device having a wireless communications transceiver for communicating with a wireless communications network, said computer executable instructions for:
receiving image data from at least one image capture device, wherein the image data comprises an image capturing at least a portion of said subject;
analyzing the received image data and determining a signature for said subject based on the analyzed image data;
requesting identification information and location information for the mobile device; and
associating the signature with said identification information and location information, wherein the location information is received from a network-based wireless location system configured to locate wireless devices using radio emissions from the wireless devices; and monitoring entry and exit of the subject with respect to a geo-fence boundary, analyzing a specific image to determine a specific personal identity to associate with the specific image and a specific mobile device, determining that the subject to be tracked corresponds to the specific personal identity, and tracking the location of the specific mobile device as a proxy for tracking the subject.

* * * * *